(12) United States Patent
McKay et al.

(10) Patent No.: US 6,320,125 B1
(45) Date of Patent: Nov. 20, 2001

(54) ELECTRONICS ENCLOSURE

(75) Inventors: Michael C. McKay, Glenwood, IA (US); Tom T. Thompson, Morrison, CO (US)

(73) Assignee: Qwest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/452,054

(22) Filed: Nov. 30, 1999

(51) Int. Cl.[7] .................................................. H05K 5/02
(52) U.S. Cl. .......................... 174/51; 439/98; 361/799; 174/40 CC
(58) Field of Search ............................ 174/51, 35 C, 174/135, 40 CC, 50, 58, 52.4, 52.6, 17 R, 60; 439/98, 100, 142; 361/799; 220/4.02, 3.2; 248/906

(56) References Cited

U.S. PATENT DOCUMENTS

| | | | |
|---|---|---|---|
| 4,595,255 | * 6/1986 | Bhatt et al. | 350/96.2 |
| 5,828,807 | 10/1998 | Tucker et al. | 385/135 |
| 5,911,019 | * 6/1999 | Cohen | 385/24 |
| 5,920,669 | * 7/1999 | Knecht et al. | 385/76 |
| 5,942,725 | * 8/1999 | Daoud | 174/51 |
| 6,017,228 | * 1/2000 | Verbeek et al. | 439/142 |
| 6,118,868 | * 9/2000 | Daoud | 379/399 |

* cited by examiner

Primary Examiner—Dean A. Reichard
Assistant Examiner—Dhiru R Patel
(74) Attorney, Agent, or Firm—Marsh Fischmann & Breyfogle LLP

(57) ABSTRACT

An enclosure for electronic devices includes a frame device for moving at least one electronic device from the interior of the enclosure to a position outside to the enclosure, or a position where the device does not obstruct access to other components. A frame device may be attached to at least one interior surface of the enclosure as well as an electronic device, such that as the frame is moved within enclosure, the electronic device, connected thereto is repositioned as well. The frame may further include an additional hinge device for rotating the electronic device away from the enclosure. With this movement of the electronic device, greater access may be provided to other electronic devices and components contained therein. The enclosure may further include a specially-adapted ground bar for grounding the individual components in the enclosure. Specially marked attachments may be provided such that individual connections are established from each component as well as a connection to an electrical ground.

16 Claims, 6 Drawing Sheets

ELECTRONICS ENCLOSURE

FIELD OF THE INVENTION

The present invention relates to an enclosure for electronic devices, and in particular, to devices mountable within the enclosure which simplify access and operations of electronic devices contained therein.

BACKGROUND OF THE INVENTION

Optical Network Units (ONU's) are commonly used in Fiber-to-the-Curb (FTTC) communications systems. An ONU is typically located in a customer's neighborhood, and receives digital communication and data signals through optical fibers from a central office location. The ONU includes circuitry which converts the optical signals received on the fiber into electronic signals. These electronic signals are transmitted to customers on coaxial cables and/or single or multiple pair cooper conductors. The ONU also includes circuitry which allows electrical signals received from the customers to be converted to optical signals which are transmitted back to the central office on the optical fiber.

The positioning and installation of an ONU may be performed in a number of different ways. In neighborhoods or areas where overhead electrical and telephone lines are still used, the ONU can be mounted on a strand or on a supporting utility pole line. Connections may be then established from the source of the signals to the destination. In areas where lines are buried, it may be necessary to locate the ONU in an enclosure such that it is easily accessible for maintenance or repair purposes. Along with the ONU, other necessary elements of the FTTC system may be included within an enclosure, such as a splice case. The splice case contains and protects connections between cables entering and exiting the ONU. Also included in the enclosure are ends of necessary connecting electrical and fiberoptic cables. Some cables may be employed for the transmission or receipt of data signals, while others may be employed to receive power in order to operate the electronic components.

SUMMARY OF THE INVENTION

The inventors have recognized that, within an electronic enclosure, it may be difficult to perform maintenance and repairs on particular components due to the sheer number of components, including electronic devices and cables within the enclosure. As such, the inventors have recognized that it may be advantageous to provide certain devices which simplify the movement of electronic devices without the necessity of disconnecting and reconnecting communication and power lines. The inventors have further recognized that certain devices may also be included in the enclosure which simplify the performance of particular procedures, such as grounding of the electronic devices and various communications and power lines.

The invention as described herein may include an enclosure for electronic devices, within which a frame for moving at least one electronic device may be installed. The frame may be mountable such that in a first position, the frame and electronic device to which it is connected are contained within the electronics device enclosure. The frame may be moved to other positions in which the portion of the frame to which the electronic device is connected extends outside the enclosure, such that other items within the enclosure, such as electronic devices, may be more easily accessible.

In one aspect of the invention, the frame includes at least one hinge device which is attachable to an interior surface of the enclosure. An electronic device may then be connected to the frame and, when access is gained to the enclosure, the hinge device may be employed to rotatively move the electronic device from inside the enclosure to outside the enclosure. Further, a locking device may be included to hold the electronic device outside the enclosure.

The frame may comprise a metallic bar of sufficient gauge, stiffness and strength, which is formed in a predetermined shape such that both ends of the bar may be rotatively attached to interior surfaces of the enclosure through use of hinge devices. An electronic device may then be connected to the bar, and when the bar and electronic device are in a first position, they are contained within the enclosure. When the frame is rotated to a second position, a portion of the frame and the electrical device are located outside the enclosure such that access is provided to other items within the enclosure.

In the scenario where the enclosure may be rectangular in shape, the frame may be U-shaped with hinge devices located at both ends. The hinged devices are attachable to interior surfaces of the enclosure which are opposite facing. Also included in at least one of the opposite facing surfaces is a stop pin which contacts and stops the rotation of the frame when it is in the second position. Also included on the same interior surface, may be a stop pin hole in which a stop pin may be inserted to hold the frame and the electronic device in the second position. When the frame and electronic device are to be moved back into the enclosure, the stop pin may be removed and the frame and electronic device rotatably moved back into the enclosure.

In another aspect of the invention, the frame may be attachable to only one interior surface of the enclosure. The frame is attached through use of a hinge device such that the frame and an electronic device connected to the frame, are rotatable from a first position within the enclosure to other positions outside the enclosure. The frame may further include a second hinge device which, when the frame is in alternative positions, provides for the rotation of a portion of the frame as well as the electronic device attached thereto, to a third position. This third position may be such that neither the frame nor the electronic device obstruct entry to the enclosure.

In another aspect of the invention, the rotatable frame is used in conjunction with an ONU typically used in a Fiber-to-the-Curb (FTTC) communications system. As part of the communications system, the ONU is contained within a specially constructed electronics enclosure which may be positioned proximate to subscribers who are to receive the signals. When access is desired to the ONU or any other electronics within the enclosure, such as a splice case, the ONU may be moved with the rotatable frame to a position such that it will not interfere with access to the enclosure.

In another aspect of the invention, an electrical device is included in the electronics enclosure which provides for the grounding of various electronics contained therein. Mountable within the enclosure is a conductive bar which may include a number of attachment points for connecting grounding wires for various electronic devices and other items contained within the enclosure. Also connected to an attachment point on the grounding bar is an electrical connection to an electrical ground located proximate to the enclosure. The bar may be mounted such that it is viewable upon access to the enclosure.

In yet another aspect of the invention, the grounding bar may include identification markings for each component within the enclosure which requires a ground. Through use of the identification, a check may be performed such that all the necessary components or other items within the enclosure are properly grounded. Attachments to the ground bar may be provided through a number of electrical connection devices which are well known in the art.

In an embodiment of the invention, and the enclosure which may be employed in a FTTC communications system, the specially identified grounding attachments are included. For example, grounding attach points may be provided for the ONU, the power source for the enclosure, the splice case, and any or all of the drop cables which run from the enclosure.

DETAILED DESCRIPTION

Figure 1:
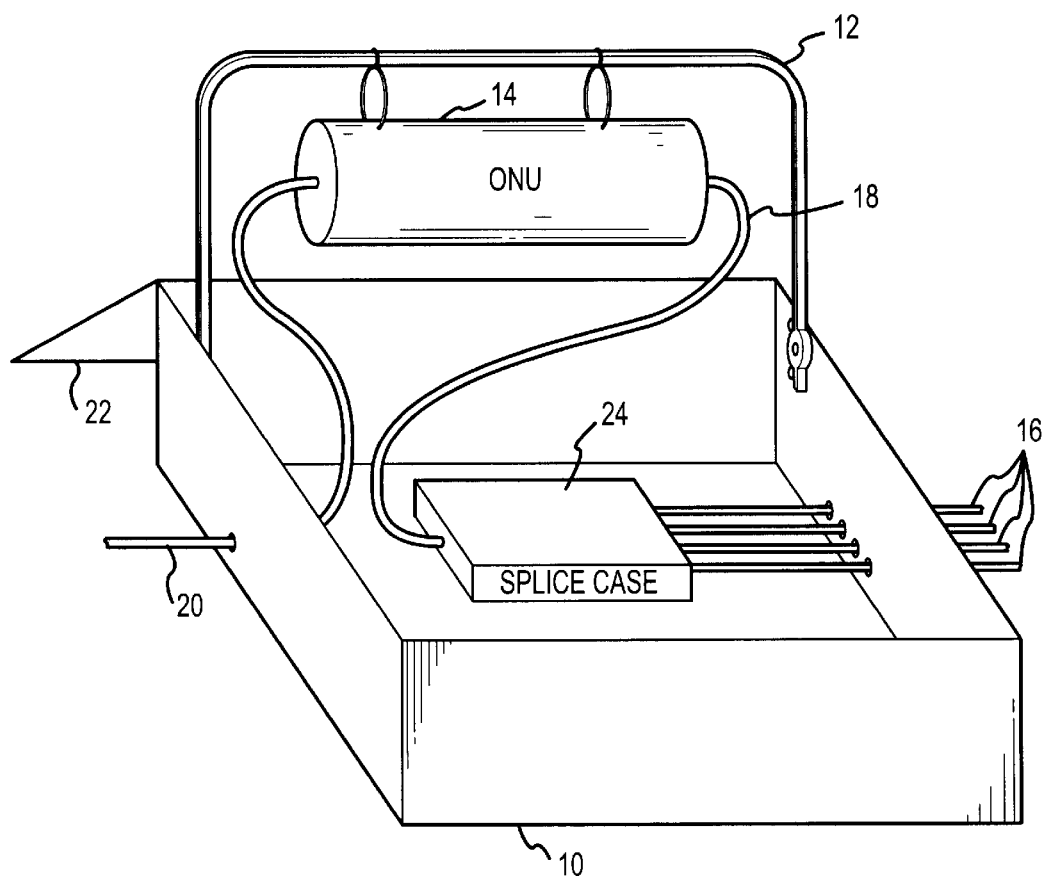
FIG. 1 discloses a geometric view of the electronics enclosure according to a first embodiment of the invention.

Disclosed in FIG. 1 is a view of an electronics enclosure according to a first embodiment of the invention. The enclosure 10 may be a box-like structure of the kind typically used to house communications electronics in outdoor locations such as in neighborhoods and near businesses. This enclosure is constructed such that it protects the items inside from any external forces such as weather, animals, or vandalism. In order to gain access to the interior a lid 22 is moved. In situations where the enclosure is employed for a Fiber-to-the-Curb (FTTC) communications system, the enclosure will include an ONU 14 for translating optical signals to electrical signals and vice-versa. Also included in the enclosure may be one or more splice cases 24 which are employed to house physical connects between distribution cables and pigtail wiring associated with the ONU. Although the present invention is described in terms of an FTTC network employing an ONU, one skilled in the art would realize that the present invention may be employed with any number of systems which use enclosures for protecting or otherwise positioning electronic devices.

When the electronic components within an enclosure, such as that disclosed in FIG. 1, are accessed, it may be difficult at times, due to the number of electronic components and then all the interconnecting cables, to provide the necessary services. In the case where an ONU and a splice case are included in the enclosure, the ONU may be located above the splice case and, in situations where repairs or other maintenance are needed to be made to the splice case, access to this component may be very difficult. Described herein is a support frame for an electronic device such as an ONU, which is movable such that, when access is gained to an enclosure, the ONU is easily moved and locked in a position such that it does not obstruct access to other components within the enclosure.

As shown in FIG. 1, the enclosure includes a frame 12 which is connected to the enclosure on opposite interior surfaces. The frame may be constructed of metal or any material of sufficient strength and stiffness to support the electronics device. ONU 14 is connected to the frame 12 is the in a hanging fashion. This connection between the ONU and frame may be established in any number of different manners.

Figure 2:
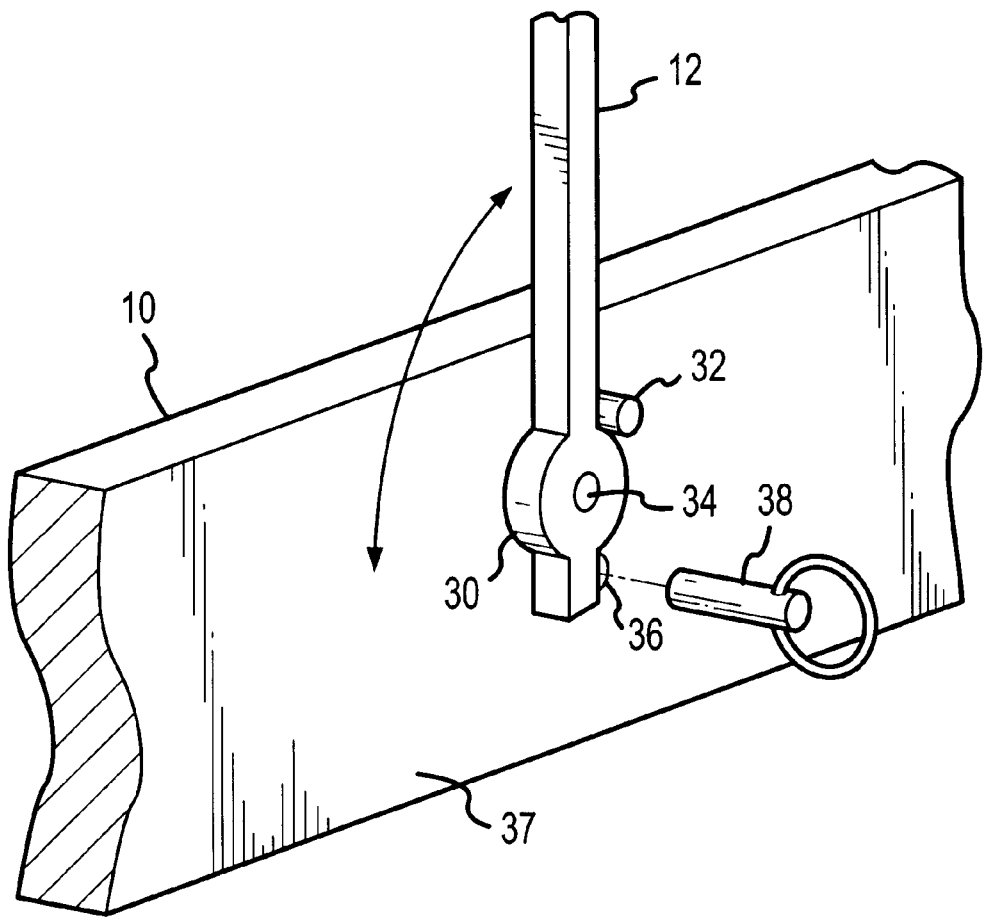
FIG. 2 discloses a view of the hinge employed for moving the electronic device out of the enclosure.

Disclosed in FIG. 2 is a close-up view of one connection of the frame to the interior of enclosure 10. These connections provide for the rotational movement of the ONU from within the enclosure to a position outside the enclosure. Included in the connection, is a hinge pin 34 around which the frame bearing 30 is in contact. The frame bearing 30 is configured such that, although it is in contact with the hinge pin 34, it easily rotates the frame about that point. Extending from an interior surface of the enclosure 10 is stop pin 32 which stops the rotation of the frame and electronic device when it is moved to a position outside the enclosure. As can be seen again in FIG. 1, when the frame 12 contacts the stop pin 32 the frame is extending out of the enclosure such that the electronic device is hanging a significant distance away from the splice case and other components within the enclosure. In the situation where the frame is rotated in the downward position, the ONU and frame are contained within the enclosure.

Returning again to FIG. 2, a locking pin hole 36 is also included in the enclosure 10. This locking hole is used in conjunction with locking pin 38 to lock the frame and electronic device in the up position. Once repairs or other functions are completed within the enclosure, the pin 38 may be removed and the electronic device may be rotated back into the enclosure. At this point, the cover 22 may be replaced and locked down.

Figure 3:
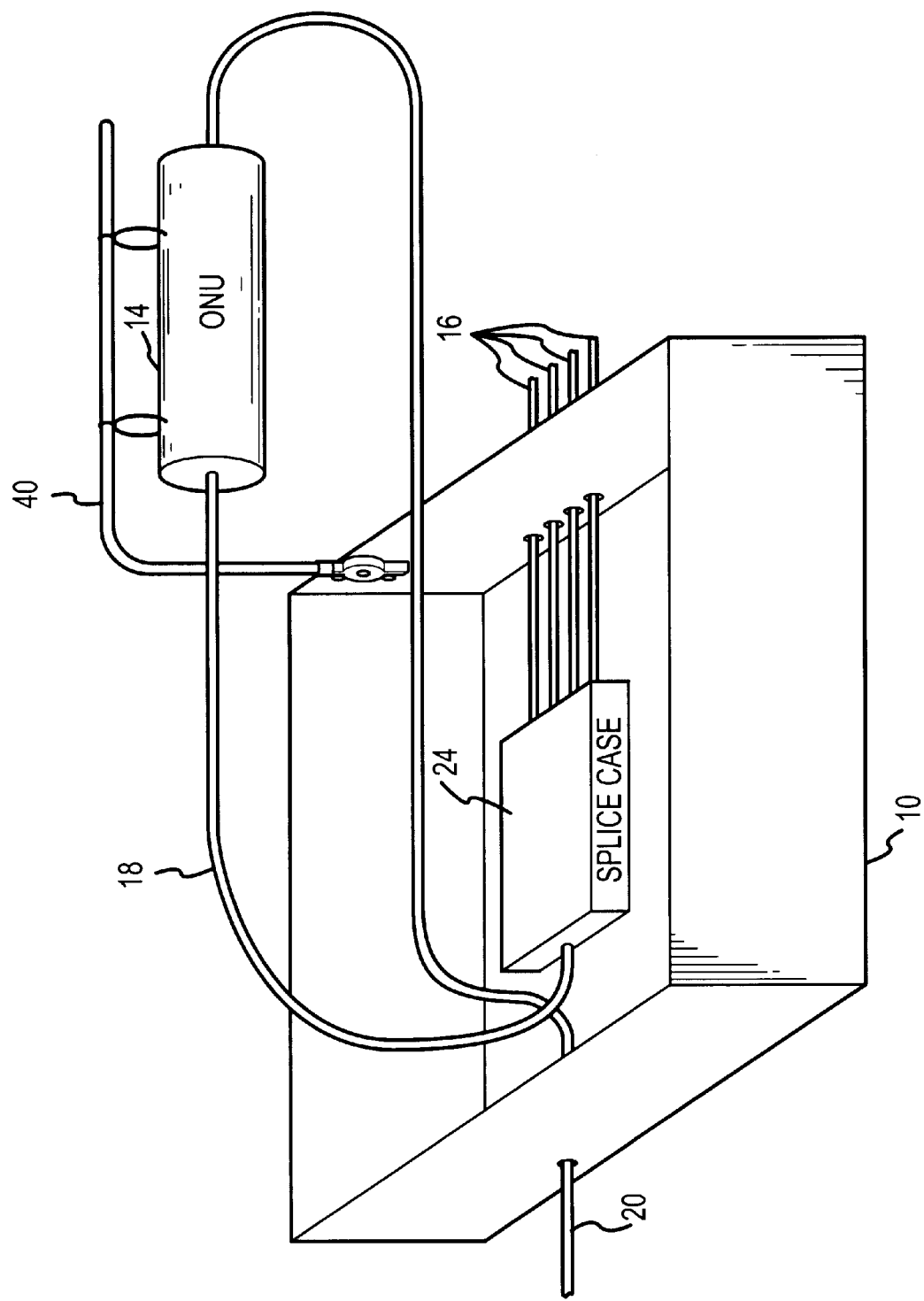
FIG. 3 discloses a geometric view of a second embodiment of the invention.

Disclosed in FIG. 3 is another embodiment of the invention. This embodiment is employed with the enclosure 10 and may be employed with the same electronic devices, such as the ONU 14 and the splice case 24. The frame 40 in this embodiment provides an additional feature not previously disclosed. In this embodiment, a single attachment is made between the frame 40 and an interior surface of the enclosure 10. An additional hinge is included as part of the frame 40 which allows for the electronic device to be rotatably moved out of the enclosure such that it initially is hanging above the splice case and any other electronics in the enclosure. A second hinge incorporated into the frame then allows for the rotation of the electronic device away from the enclosure providing for unobstructed access to the interior of the enclosure.

Figure 4:
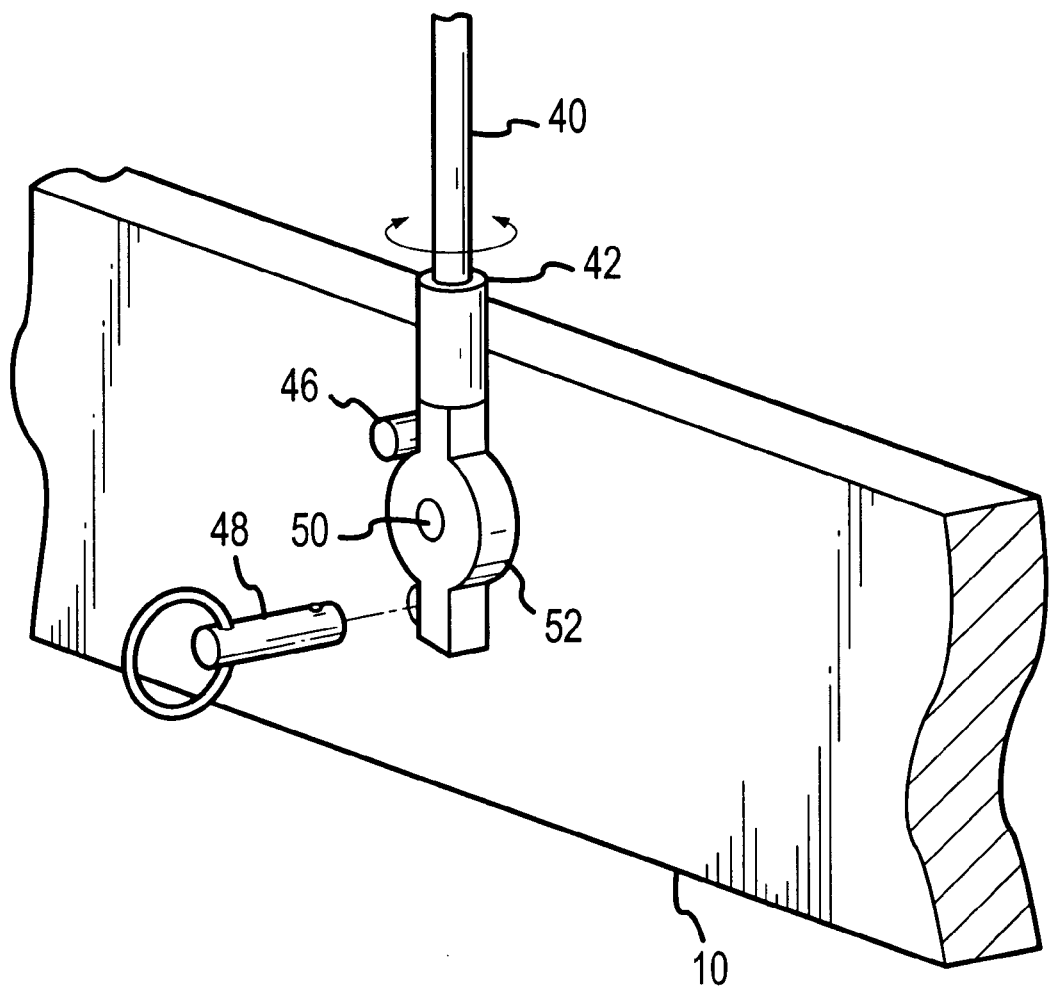
FIG. 4 discloses a view of the first and second hinges to rotatably move the electronic device out of the enclosure and then away from the enclosure.

Disclosed in FIG. 4 is a close-up view of the dual hinge device employed with the second embodiment. Also included in this embodiment is hinge pin 50 extending from the enclosure 10 as well as a bearing 52 which rotates about the hinge pin. Further, stop pin 46 provides a stop point for rotation of the frame and electronic device out of the enclosure. The enclosure also includes a stop pin hole 49 in which the stop pin 48 may be inserted when the frame and electronic device are rotated out of the enclosure 10.

The frame 40 further includes a hinge device 42. Within the hinge device 42 is a bearing surface against which the circular frame 40 may rotate. When the electronic device has been rotated out of the enclosure, it then may be rotated in a direction away from the enclosure through use of this hinge 42. Upon completion of any repairs or maintenance made within the enclosure, the frame may then be rotated such that the electronic device is hanging above the enclosure. The stop pin 48 may be removed and the electronic device and frame rotated using the hinge device such that it is, once again, contained within the enclosure.

Figure 5:
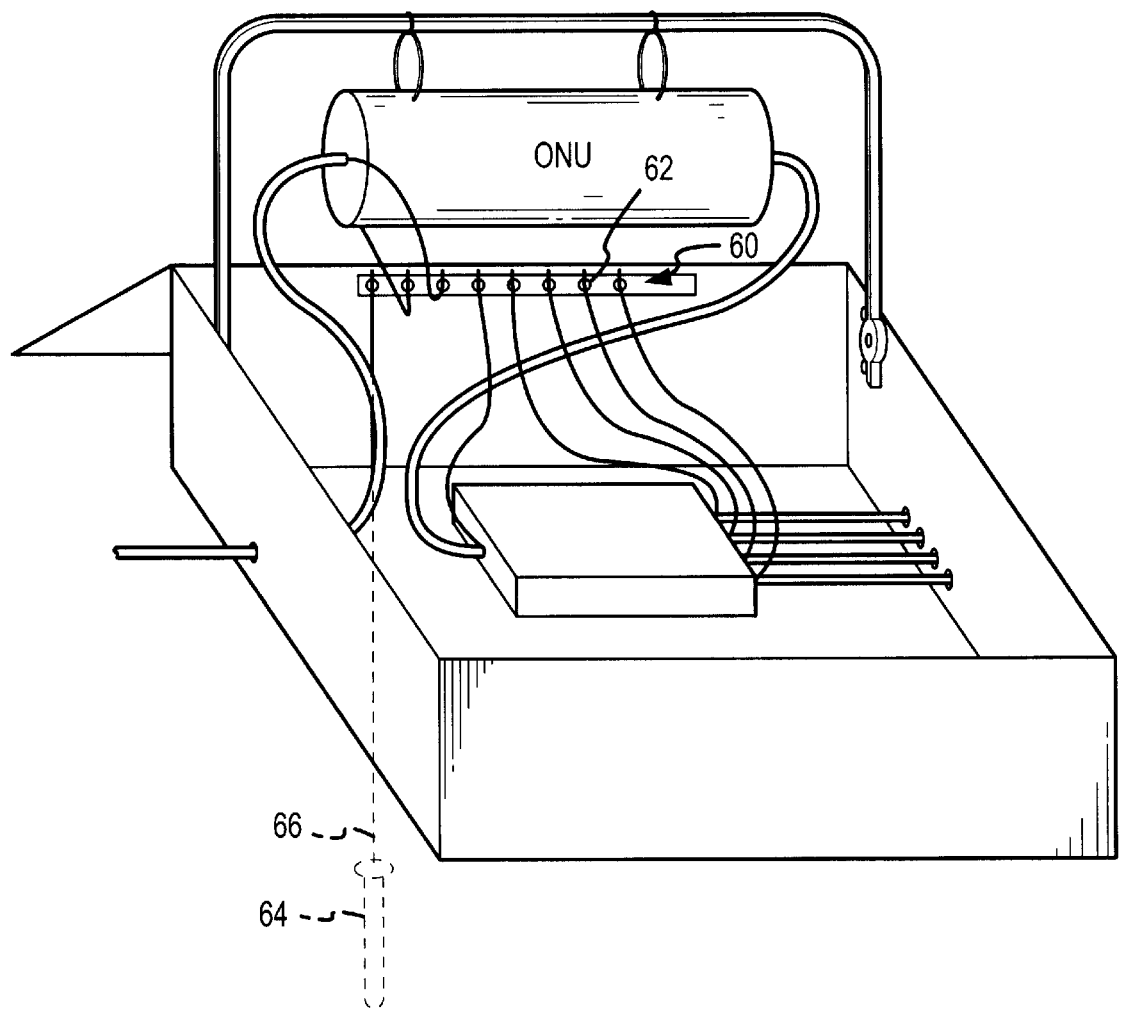
FIG. 5 discloses a geometric view of the enclosure including the electric ground bar.

Disclosed in FIG. 5 is a view of an electronic enclosure which includes another aspect of the invention. As with the previous embodiments, the enclosure may be employed in an FTTC communications system. One concern with regards to use of electronic components, such as an ONU, in a an electronics enclosure which is located outdoors is that electrical surges may occur due to lightening strikes or other occurrences. In order to protect against damage caused by such surges, it is desirable to ground as many of the electrical components in the enclosure as possible. These components may include the ONU and splice case as well as the drop cables and the incoming power source.

In order to simplify the electrical grounding of these components, the enclosure shown in FIG. 5 includes a ground bar 60 which includes a number of attachment points 62, which when electrical component(s) are connected to the bar, directs any spurious electrical surges to ground.

A conductor 66 is provided between the ground bar and a buried grounding post 64. Any electrical surges transmitted through the grounding bar are directed to this grounding device. The ground bar 60 may be made of any known metallic material which can be used to conduct electrical signals. The ground bar may be mounted in any location within the enclosure, however, it may be desirable to mount it in a location near the opening such that it is easily accessible to a party who wishes to connect the various ground wires.

As can be seen in the diagram of FIG. 5, ground wires extending from the various electrical components, are connected to the ground bar. The components which may be grounded through the use of this device include the ONU, the splice case, each of the drop cables running from the splice case, as well as the incoming fiberoptic line which may include an electrical conductor for providing power to the ONU, as well as any other components which may be included in the enclosure.

In order to simplify the connection of the ground wires, identification information for each attachment point may be included on the ground bar. For example, each grounded device has its own marked attachment point such that it simplifies identifying which components have been grounded and which have not. The attachment points may be any known connector for making electrical connections. For example, the attachment point may be a screwed down nut which upon insertion of a ground wire, holds this wire against the conductor. Other clamp or twist connections may be employed to make the connection.

Figure 6:
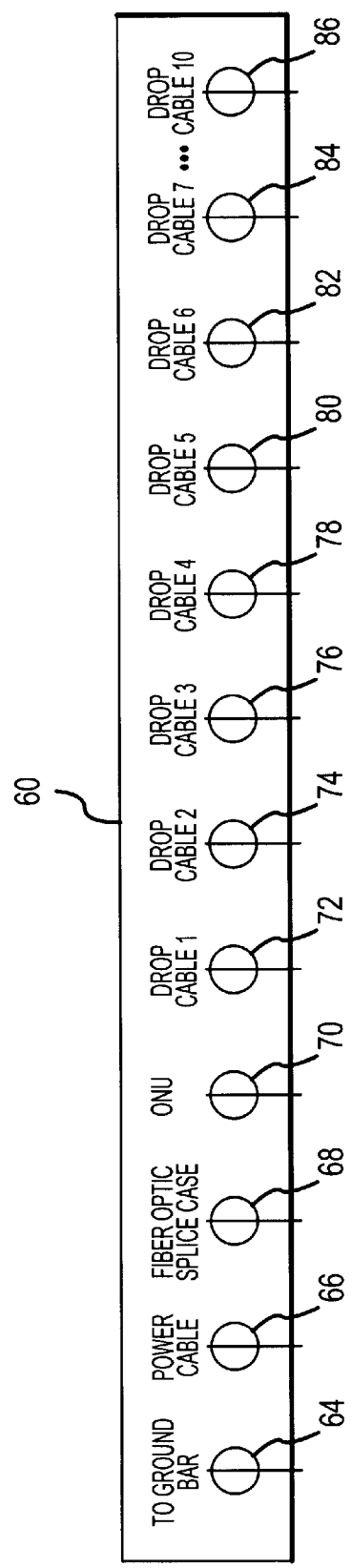
FIG. 6 discloses a front view of the electric ground bar including the markings for the attachments.

Disclosed in FIG. 6 is a front view of the ground bar which includes the markings for each of the attachment points. First, the ground bar includes an attachment point for the ground stake, this is attachment 64. On the ground bar, markings and attachment points are provided for the power cable 66, fiberoptic splice case 68, the ONU 70, and drop cables 72–86. The identification markings provide a sort of checklist for an operator to confirm that all the necessary components have been grounded.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An electronics apparatus comprising:
    an enclosure configured for receiving at least one electronic device, wherein the enclosure includes a plurality of internal surfaces and an opening through which the at least one electrical device is accessible; and
    a support frame rotatably connectable to at least one of the plurality of interior surfaces of the enclosure which is attachable to at least one electronics device, where the support frame is rotatable in at least one direction to move the at least one electronics device through the opening to other positions outside the enclosure.

2. The apparatus of claim 1 wherein the support frame comprises a U-shape bar which is attachable to the plurality of internal surfaces.

3. The apparatus of claim 2 wherein each end of the bar includes a hinge device which when connected to the enclosure provides for rotational movement of the bar and any objects attached thereto.

4. The apparatus of claim 1 wherein the support frame comprises an L-shape bar which is rotatably attachable on one end to one of the plurality of internal surfaces of the enclosure, such that the at least one electronic device attached thereto may be rotatably moved from a first position to a second position and back again.

5. The apparatus of claim 4 wherein the support frame further includes a hinge device which provides for rotation of a portion of bar and the device attached thereto to a third position.

6. The apparatus of claim 1 wherein the enclosure is employed to shelter equipment employed in communications networks.

7. The apparatus of claim 6 wherein the at least one electronic device is an Optical Network Unit.

8. The apparatus of claim 1 further including a grounding device comprising an electrically conductive bar which is connectable to ground, and further includes a plurality of attachment points for grounding wires.

9. The apparatus of claim 8 wherein each of the plurality of attachments is specially marked for grounding of a particular component within the enclosure.

10. A support apparatus for an enclosure comprising:
    a support frame connectable to an interior surface of the enclosure, comprising:
        a first hinge connectable to the interior surface which rotates at least one electronic device through an opening in the enclosure to a location outside the enclosure; and
        a second hinge which rotates the at least one electronic device away from the enclosure.

11. The apparatus of claim 10 wherein the support frame comprises a U-shaped bar which is attachable to a plurality of the interior surfaces.

12. The apparatus of claim 11 wherein each end of the bar includes a hinge device which when connected to the enclosure provides for rotational movement of the bar and any objects attached thereto.

13. The apparatus of claim 10 wherein the support frame comprises an L-shaped bar which is rotatably attachable on one end to the interior surface of the enclosure, such that the at least one electronic device attached thereto may be moved from a first position to a second position and back again.

14. The apparatus of claim 13 wherein the support frame further includes a hinge device which provides for rotation of a portion of bar and the at least one electronic device attached thereto to a third position.

15. The apparatus of claim 10 wherein the enclosure is employed to shelter equipment employed in communications networks.

16. The apparatus of claim 15 wherein the at least one electronics device is an ONU.

* * * * *